United States Patent [19]

Nishikawa

[11] Patent Number: 5,022,282
[45] Date of Patent: Jun. 11, 1991

[54] TILT STEERING APPARATUS

[75] Inventor: Masumi Nishikawa, Toyoake, Japan

[73] Assignee: Aisin Seiki Kabushiki Kaisha, Japan

[21] Appl. No.: 328,241

[22] Filed: Mar. 24, 1989

[30] Foreign Application Priority Data

Mar. 24, 1988 [JP] Japan .................................. 63-70208
Mar. 24, 1988 [JP] Japan .................................. 63-70209

[51] Int. Cl.$^5$ ............................................. B62D 1/18
[52] U.S. Cl. ....................................... 74/493; 280/775
[58] Field of Search ..................... 74/493, 495; 280/775

[56] References Cited

U.S. PATENT DOCUMENTS

| 4,530,254 | 7/1985 | Toyoda et al. | 74/493 |
| 4,723,461 | 2/1988 | Yoshida et al. | 74/493 |
| 4,750,379 | 6/1988 | Nishikawa et al. | 74/493 |
| 4,752,085 | 6/1988 | Yamamoto | 74/493 |
| 4,876,910 | 10/1989 | Nishikawa | 74/493 |

FOREIGN PATENT DOCUMENTS 3410568 10/1984 Fed. Rep. of Germany ........ 74/493

Primary Examiner—Allan D. Herrmann
Assistant Examiner—Scott Anchell
Attorney, Agent, or Firm—Banner, Birch, McKie & Beckett

[57] ABSTRACT

A tilt steering apparatus includes a fixed bracket, a movable bracket pivotably mounted to the fixed bracket by a center pin, a ratchet provided to the movable bracket, a pawl mounted rotatably to the fixed bracket and meshed with the ratchet for regulating the position thereof, a tilt-operating lever mounted rotatably on the center pin for engaging or disengaging between the ratchet and the pawl, a first biasing device disposed between the fixed bracket and the movable bracket so as to urge the movable bracket to its away-position, a stopper provided to the fixed bracket and engaged with the ratchet for regulating the movable bracket positioned at its away position, a pawl lever mounted rotatably on the center pin and mounting pivotally the pawl, a second biasing device disposed between the tilt-operating lever and the pawl lever for rotating the pawl lever in one direction, a hook lever mounted pivotally to the fixed bracket and engaged with the pawl lever for preventing the rotation in one direction thereof, a driving mechanism associated with the fixed bracket for driving an away-operating gear so that the away-operating gear may rotate the hook lever upon actuation of the driving mechanism for separating the hook lever from the pawl lever wherein the movable bracket is transferred to its away-position by the first biasing device, a lock lever mounted rotatably on the fixed bracket and rotated after rotation of the pawl lever upon rotation of the away-operating-gear; and a lock shaft mounted to the fixed bracket to be rotated by the lock lever upon rotation thereof and holding the ratchet with the stopper means for preventing the movement of the movable bracket at its away-position.

7 Claims, 4 Drawing Sheets

TILT STEERING APPARATUS

BACKGROUND OF THE INVENTION

1. Field of the Invention

The present invention relates to a tilt steering apparatus and in particular to a tilt steering apparatus in which a steering wheel is movable to an upward away-position to permit a driver to easily enter or exit a vehicle.

2. Description of the Prior Art

A conventional tilt steering apparatus is disclosed in Japanese Patent Laid-Open Print No. 59-179451 published without examination on Oct. 12, 1984. In the conventional tilt steering apparatus, a steering wheel can be moved to an upward away-position by operating a tilt-operating lever. Once the steering wheel is in the upward away-position, the only force holding it in that position is a spring-biasing force. When the steering wheel is oriented into its away-position, a force applied thereto may undesirably return to its operating position. For example, when the driver is getting into or out of the vehicle, he/she may lose his/her balance and lean on the steering wheel. As a result, the steering wheel may fall back to its operating position due to the possible inadequacy of the spring biasing means.

SUMMARY OF THE INVENTION

In view of the above and other deficiencies of the known prior art, it is the object of the present invention to provide a tilt steering apparatus for repositioning the steering wheel and reliably maintaining the wheel in the desired position.

It is another object of the invention to automatically tilt the steering wheel away from the driver in response to vehicle conditions and reliably maintaining the wheel in the away-position.

It is a further object of the present invention to integrate linkages for manually adjusting the tilt angle of the steering wheel and linkages for automatically lifting the steering wheel.

To achieve the objects and in accordance with the purposes of the present invention, a tilt steering apparatus is comprised of a fixed bracket, a movable bracket pivotally mounted to the fixed bracket by a center pin, a ratchet is attached to the movable bracket, a pawl is rotatably mounted to the fixed bracket and meshed with the ratchet for regulating the position thereof, a tilt-operating lever is mounted rotatably on the center pin for engaging or disengaging between the ratchet and the pawl, a first biasing device disposed between the fixed bracket and the movable bracket is designed to urge the movable bracket to its away-position, a stopper provided on the fixed bracket and engaged with the ratchet for regulating the movable bracket positioned at its away-position, a pawl lever mounted rotatably on the center pin and mounting pivotally to the pawl, a second biasing device disposed between the tilt-operating lever and the pawl lever for rotating the pawl lever in one direction, a hook lever mounted pivotally to the fixed bracket and engaged with the pawl lever for preventing the rotation in one direction thereof, a driving mechanism provided to the fixed bracket and rotating the hook lever upon actuation of the driving mechanism for separating the hook lever from the pawl lever, whereby the movable bracket is transferred to its away-position by the first biasing device, a lock lever mounted rotatably on the fixed bracket and rotated after rotation of the pawl lever upon rotation of the away-operating-gear; and a lock shaft mounted to the fixed bracket to be rotated by the lock lever upon rotation thereof and holding the ratchet with the stopper means for preventing the movement of the movable bracket at its away-position.

The above and other important features and advantages of the present invention will become apparent and more readily appreciated from the following description and the accompanying drawings, wherein for purposes of illustration only, a specific form of the invention is shown in detail.

DETAILED DESCRIPTION OF THE PREFERRED EMBODIMENT

Figure 1:
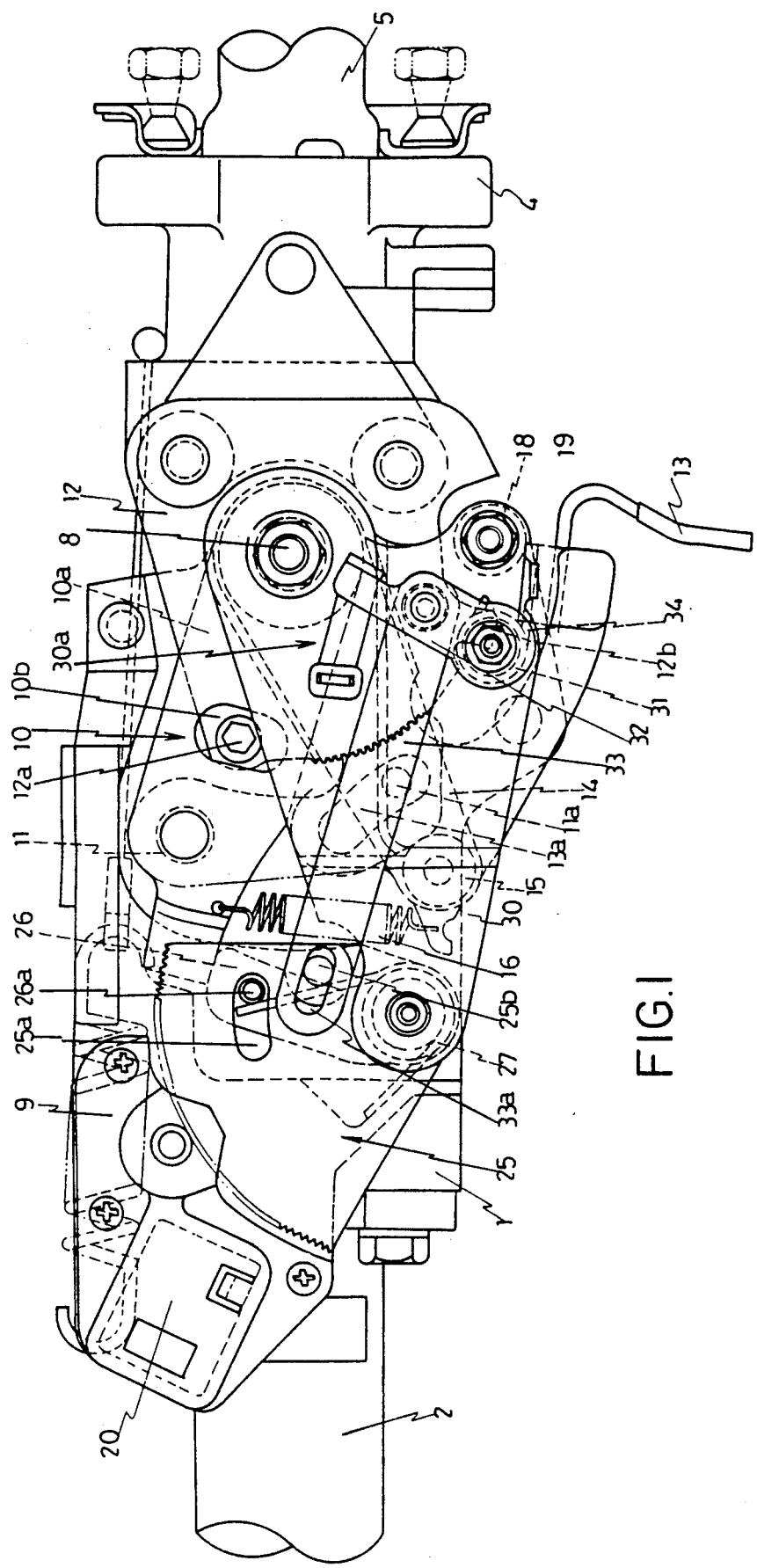
FIG. 1 is a side view of a tilt steering apparatus in accordance with a preferred embodiment of the present invention.
Figure 2:
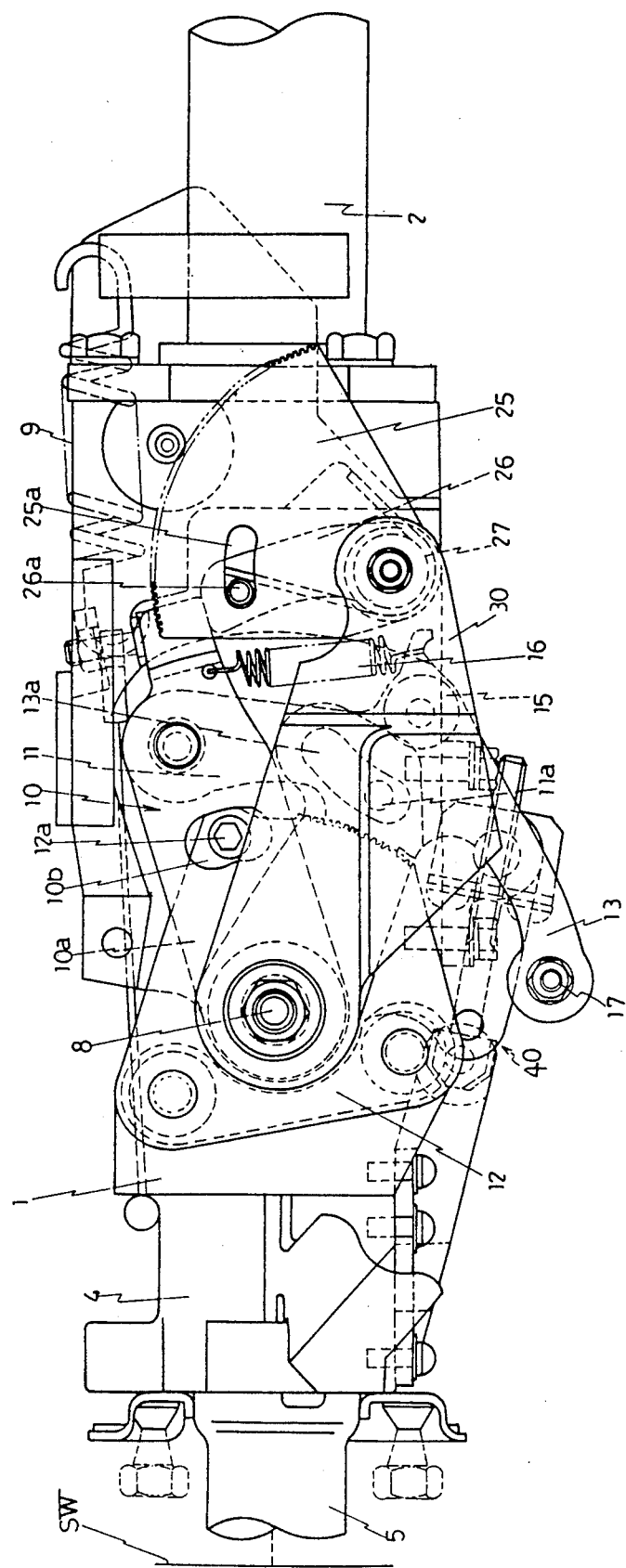
FIG. 2 is another side view of the tilt steering apparatus of FIG. 1.
Figure 3:
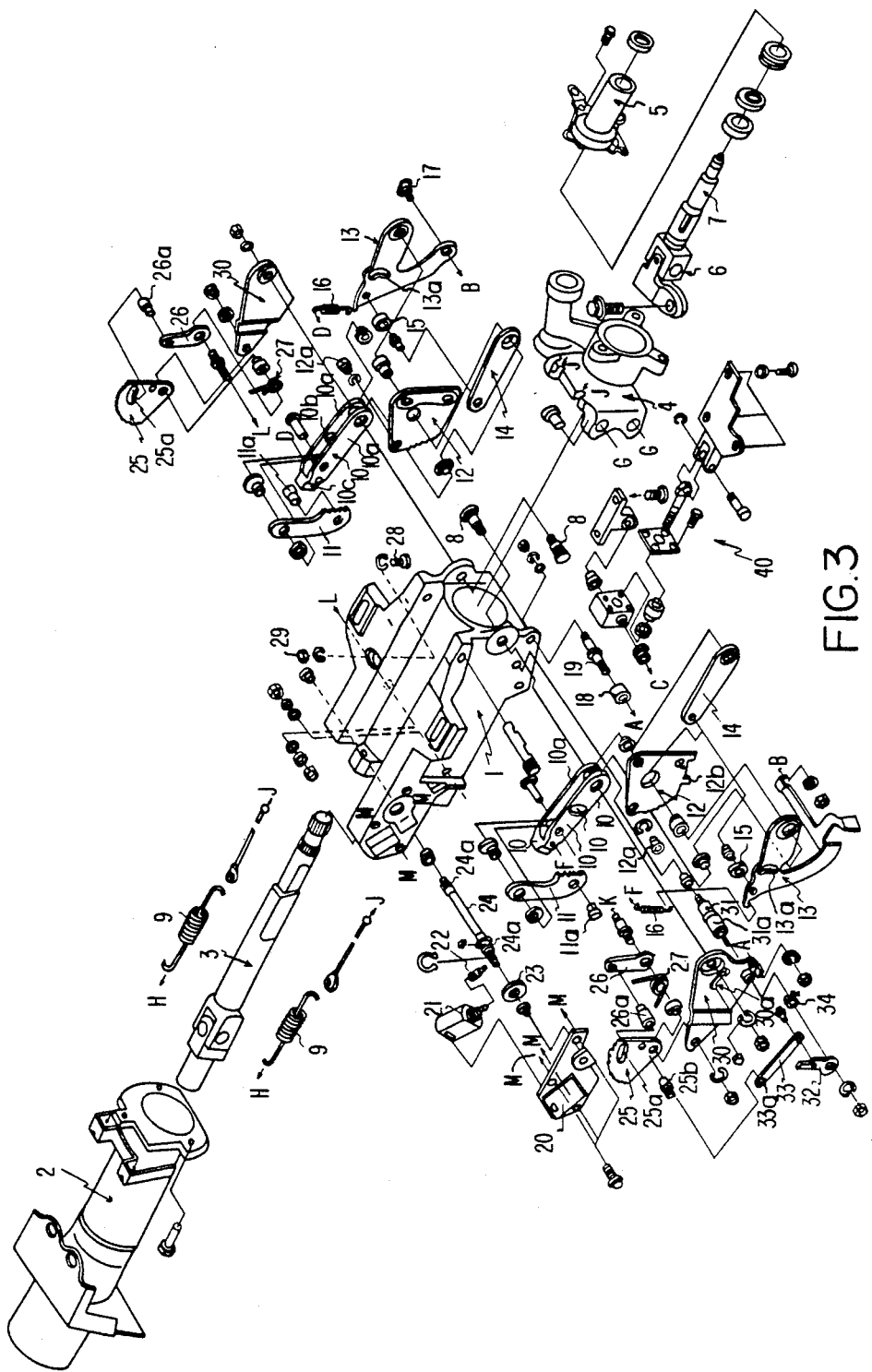
FIG. 3 is an exploded perspective view of the tilt steering apparatus illustrated in FIGS. 1 and 2.

Referring to the drawings in detail, wherein like numerals indicate like elements, FIGS. 1 through 7 show a tilt steering apparatus in accordance with a preferred embodiment of the present invention. Referring to FIGS. 1-3, intermediate shaft 3 and main shaft 7 are rotatably mounted on fixed bracket 1 which is secured to a vehicle body. Intermediate shaft 3 is rotatably supported in column tube 2 which is secured to fixed bracket 1. Main shaft 7 is rotatably supported in movable bracket 4 and upper tube 5. Main shaft 7 is connected to intermediate shaft 3 via joint 6 so as to be rotatable together with intermediate shaft 3 and tiltable relative thereto. Main shaft 7 is also connected to steering wheel SW. Movable bracket 4 is pivotally coupled to fixed bracket 1 via center pin 8 so as to be tiltable relative to fixed bracket 1. It should be noted that an axis of center pin 8 and the tilting center of main shaft 7 are on a common axis. Between column tube 2 and movable bracket 4, there is interposed spring 9 so as to urge or bias movable bracket 4 in the upward direction. Between fixed bracket 1 and movable bracket 4, damper mechanism 40 is disposed for ensuring smooth movement of movable bracket 4.

Figure 5:
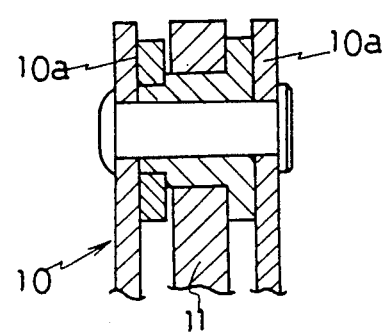
FIG. 5 is a cross-sectional view showing another main portion of the tilt steering apparatus of FIG. 1.

Pawl lever 10 is pivotally coupled about center pin 8 at a side of fixed bracket 1 and has a pair of spaced plates 10a between which pawl 11 is pivotally mounted (FIG. 5). Pawl 11 cooperates with ratchet 12 which is pivotally coupled to one side of movable bracket 4.

Pin 12a is coupled to ratchet 12 and is in sliding engagement with slot 10b formed in pawl lever 10. Thus, slot 10b limits the movement of pin 12a and ratchet 12 relative to pawl lever 10, thereby defining the operating range of steering wheel SW. Furthermore, pin 19 with collar 18 is coupled to fixed bracket 1 so that collar 18 is engageable with pin 12a of ratchet 12. Thus, movements of ratchet 12 and pawl lever 10 relative to fixed bracket 1 are regulated and an upward away-position of steering wheel SW is determined.

A pair of tilt-operating levers 13 are rotatably mounted on respective center pins 8 so as to be movable relative to fixed bracket 1. Both tilt-operating levers 13 are connected with each other by bolt 17. Tilt-operating lever 13 is connected to a distal end of lever 14 for unitary rotation via collar 15 which is engageable with pawl 11. Between pawl lever 10 and tilt-operating lever 13, there is interposed spring 16, thereby urging collar 15 towards pawl lever 10. This arrangement assures continual engagement between pawl 11 and ratchet 12. Pin 11a is coupled to pawl 11 and is in sliding engagement with slot 13a formed in tilt-operating lever 13. Since pawl 11 rotates with tilt-operating lever 13, pawl 11 may be disengaged from ratchet 12.

Casing 20 is fixedly mounted to fixed bracket 1. In casing 20, there is installed motor 21 having a shaft to which worm screw 22 is provided. Worm 22 is operatively connected to gear shaft 24 via worm wheel 23. Gear shaft 24 is rotatably supported to fixed bracket 1 and has opposite ends extending outwardly therefrom. Each end of gear shaft 24 is in the form of geared portion 24a and geared portion 24a meshes with away-operating gear 25. Fixed plate 30 is secured to fixed bracket 1 and rotatably supports away-operating gear 25. Thus, away-operating gear 25 can be rotated by motor 21. Hook lever 26 is swingably mounted on fixed plate 30 and is in alignment with away-operating gear 25. The distal end of hook lever 26 cooperates with cam portion 10c of pawl lever 10. Hook lever 26 is urged or biased toward engagement with cam portion 10c by torsion spring 27 which is disposed between away-operating gear 25 and hook lever 26. Pin 26a, which is coupled to hook lever 26, is in sliding engagement with slot 25a which is formed in away-operating gear 25. Thus, hook lever 26 can be rotated together with the rotation of away-operating gear 25. Pin 28 projects from fixed bracket 1. The projection may be varied by nut 29. Pin 28 also is in abutment with pawl lever 10. Thus, the position of pawl lever 10 can be adjusted.

Figure 4:
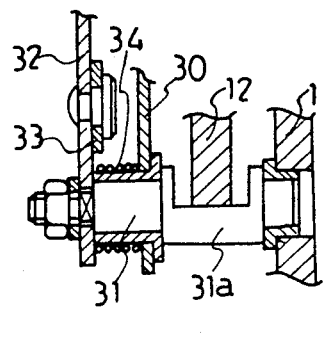
FIG. 4 is a cross-sectional view showing a main portion of the tilt steering apparatus of FIG. 1.

Referring to FIGS. 1–4 and specifically to FIG. 4, fixed plate 30 is coupled to fixed bracket 1. On fixed plate 30, there is rotatably mounted lock shaft 31 on which lock lever 32 is rotatably mounted. Lock lever 32 is operatively connected to away-gear 25 via link 33. Thus, lock lever 32 is rotated as away-gear 25 is rotated. Pin 25b is spaced from an end of slot 25a so that the engagement therebetween occurs after the operation of hook lever 26.

Lock shaft 31 is formed with locking portion 31a which is of a semi-circular shape. Pawl portion 12b is engageable, or in other words, cooperates with locking portion 31a. Stopper portion 30a is formed on fixed plate 30 for regulating or limiting the rotating range of lock lever 32. Torsion spring 34 is positioned between lock lever 32 and fixed plate 30 for urging lock lever 32 to disengage pawl portion 12b from lock shaft 31.

Figure 6:
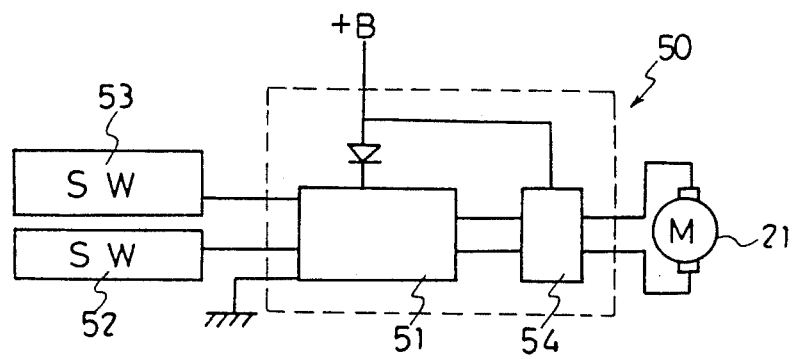
FIG. 6 shows a motor control circuit for controlling a motor.
Figure 7:
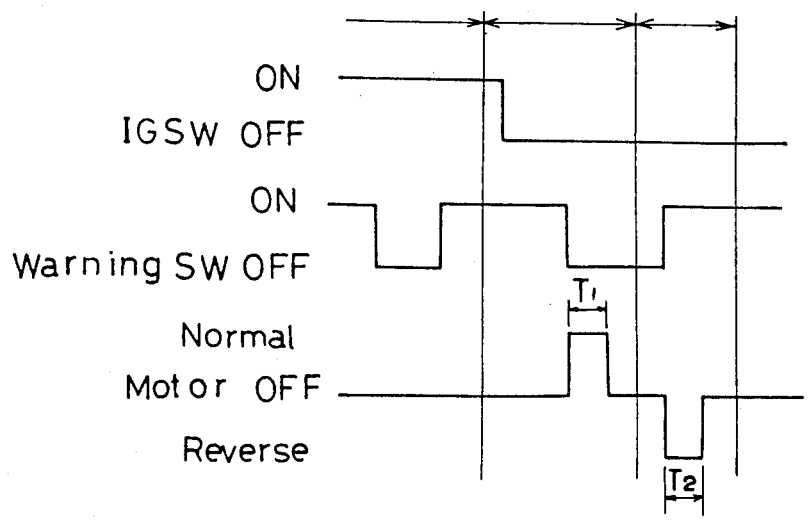
FIG. 7 graphically illustrates motor operation in response to the control circuit of FIG. 6.

Referring to FIG. 6, motor control circuit 50 controls the operation of motor 21. Control circuit 50 includes relay control circuit 51, ignition switch 52 for detecting the condition (ON or OFF) of an ignition device and unlock warning switch 53 for detecting a key insertion condition. Ignition switch 52 and unlock warning switch 53 are coupled to relay control circuit 51 which is connected with motor 21 through relay 54. Relay control circuit 51 generates a signal in accordance with the detected condition to actuate relay 54 which in turn causes motor 21 to operate corresponding to interval T1 or T2.

In operation, lever 13 may be manipulated to adjust the position of the steering wheel without assistance from motor 21, while motor 21 causes the steering wheel to automatically tilt away from the driver in accordance with particular vehicle conditions. Specifically, when tilt-operating lever 13 is rotated in the counter-clockwise direction against the bias of spring 16, while viewing FIG. 1, collar 15 is removed from pawl 11 and pawl 11 is brought into the clockwise rotation due to the engagement between pin 11a and slot 13a. Then, pawl 11 is disengaged from ratchet 12 and movable bracket 4 and ratchet 12 are movable relative to fixed bracket 1 within the length of slot 10b. Thus, the driver may use lever 13 to manually select his/her favorite position of steering wheel SW for driving the vehicle.

As illustrated in FIG. 6, when the automobile ignition device (not shown) is turned off, ignition switch 52 sends a signal to relay control circuit 51 denoting the condition that the ignition device is in the off position. Then, when the ignition key (not shown) is removed from the ignition device, warning switch 53 sends a signal to relay control circuit 51 denoting the condition that the key is no longer present in the ignition device key cylinder (not shown). In response to these signals, motor relay control circuit 51 generates a signal which actuates motor relay 54. As a result, motor 21 operates the interval T1 in accordance with FIG. 7 which results in the counter-clockwise rotation of away-gear 25 while viewing FIG. 1. Due to the resulting rotation, hook lever 26 is rotated in the counter-clockwise direction, while viewing FIG. 1, against the biasing force of torsion spring 27. As a result, movable bracket 4 is brought into rotatable condition after disengagement of cam portion 10c of pawl lever 10 and hook lever 26. Thus, movable bracket 4 is rotated in the counter-clockwise direction, while viewing FIG. 1, by spring 9 and is transferred to an away-position between lock shaft 31 and collar 18. The driver, then, can get into or out of the vehicle with ease. It should be noted that cam portion 10c of pawl lever 10 is in engagement with hook lever 26 so as to regulate the rotation thereof while movable bracket 4 is in the away-position, i.e., away from the driver.

Due to further rotation of away-operating gear 25, pin 25b is brought into engagement with slot 33a, link 33 is pushed and lock lever 32 is brought into rotation. Together with the rotation of lock lever 32, lock shaft 31 is rotated and pawl portion 12b is brought into position between lock portion 31a and collar 18. Thus, the rotational movement of movable bracket 4 is regulated and is held at the away-position. As a result, movable bracket 4 cannot be moved even if the driver leans on the steering wheel SW while getting in or out of the vehicle.

Returning to FIG. 6, when the key is inserted into the key cylinder while the ignition apparatus is in the OFF condition, motor 21 is driven in the reverse direction during set time T2, lock shaft 31 is rotated in the reverse direction and the engagement between pawl portion 12b and collar 18 is released. Thus, movable bracket 4 is ready for rotation. Consequently, when steering wheel SW is pushed in the down direction against the biasing force of spring 9, movable bracket 4, ratchet 12, pawl 11 and pawl lever 10 are rotated in the clockwise direction, while viewing FIG. 1 thereby returning steering wheel SW to its previously set position. Simultaneously, the engagement between hook lever 26 and cam portion 10c of pawl lever 10 is released, hook lever 26 is rotated in the clockwise direction, while viewing FIG. 1, by the biasing force of torsion spring 27, the distal end of hook lever 26 is brought into engagement with cam portion 10c of pawl lever 10 and steering wheel SW is held at previously set position, i.e., the position set by using tilt lever 13.

It should be noted that steering wheel SW can be returned to its previously set position due to continuous engagement between pawl 11 and ratchet 12. Since the tilting operation of steering wheel SW is regulated by slot 10b and the positioning of steering wheel SW is regulated by collar 18, the latter can be set independent from the former. Thus, steering wheel SW can be moved to its away-position though steering wheel SW is set at the uppermost operating position. Further, since motor 21 cannot be driven so long as the ignition apparatus is in the ON condition, steering wheel SW cannot be moved to the away-position once the vehicle is started.

Having described the invention in detail, it will be recognized that the foregoing is considered as illustrative only of the principles of the invention. Since numerous modifications and changes will readily occur to those skilled in the art, it is not desired to limit the invention to the exact construction, materials, assembly and so forth shown and described. Accordingly, all suitable modifications and equivalents may be restored to the extent they fall within the scope of the invention and claims appended hereto.

I claim:

1. A tilt steering apparatus comprising:
   a fixed bracket;
   a movable bracket pivotally mounted to the fixed bracket by a center pin;
   a ratchet coupled to the movable bracket;
   a pawl lever rotatably mounted on the center pin;
   a pawl movable relative to the fixed bracket and meshed with the ratchet for regulating the position thereof, the pawl also being pivotally mounted directly to the pawl lever;
   tilt lever means rotatably mounted on the center pin for controlling engagement between the ratchet and the pawl;
   first biasing means disposed between the fixed bracket and the movable bracket for biasing the movable bracket to an away-position;
   stopper means provided on the fixed bracket and operatively engaging the ratchet for regulating the movement of the movable bracket at said away-position;
   second biasing means disposed between the tilt-operating lever and the pawl lever for urging the pawl lever to rotate in one direction;
   a hook lever means pivotally mounted to the fixed bracket and engaged with the pawl lever for preventing pawl lever rotation in one direction;
   gear means associated with the fixed bracket for rotating the hook lever to separate the hook lever from the pawl lever so that the movable bracket may be transferred to said away-position by the first biasing means, said gear means including a pin located adjacent the center of rotation of said gear;
   drive means for driving the gear means;
   a lock lever rotatably mounted on the fixed bracket and rotatable in accordance with pawl lever rotation;
   locking means, mounted to the fixed bracket and coupled to the lock lever to rotate therewith, for holding the ratchet with the stopper means, thereby preventing the movement of the movable bracket at its away-position; and
   a link means operatively coupling said gear pin and said lock lever.

2. The tilt steering, apparatus according to claim 1 further comprising another ratchet, pawl, hook lever, pawl lever and gear means all of which are associated in a manner corresponding to the association of the first ratchet, pawl, hook lever, pawl lever and gear means, and positioned at the opposite side of the fixed bracket.

3. The tilt steering apparatus according to claim 1 further including regulation means for regulating ratchet rotation relative to the pawl lever and the fixed bracket.

4. The tilt steering apparatus according to claim 1 further including drive control means for controlling the operation of said drive means.

5. The tilt steering apparatus to claim 4 wherein said drive control means actuates the drive means in a first direction in response to a first condition.

6. The tilt steering apparatus according to claim 4 wherein said drive control means actuates the drive means in a second direction in response to a second condition.

7. The tilt steering apparatus according to claim 4 wherein said drive control means prevents the operation of said drive means and corresponding movement of said movable bracket in response to a third condition.

* * * * *